United States Patent
Nijdam et al.

(10) Patent No.: US 11,193,620 B2
(45) Date of Patent: Dec. 7, 2021

(54) RISER CLAMP WITH A VIBRATION ISOLATION ELEMENT

(71) Applicant: J. van Walraven Holding B.V., Mijdrecht (NL)

(72) Inventors: Frank Nijdam, Zeewolde (NL); Marek Juzak, Mijdrecht (NL)

(73) Assignee: J. VAN WALRAVEN HOLDING B.V, Mijdrecht (NL)

(*) Notice: Subject to any disclaimer, the term of this patent is extended or adjusted under 35 U.S.C. 154(b) by 0 days.

(21) Appl. No.: 16/652,109

(22) PCT Filed: Oct. 15, 2018

(86) PCT No.: PCT/NL2018/050677
§ 371 (c)(1),
(2) Date: Mar. 30, 2020

(87) PCT Pub. No.: WO2019/078710
PCT Pub. Date: Apr. 25, 2019

(65) Prior Publication Data
US 2020/0309305 A1    Oct. 1, 2020

(30) Foreign Application Priority Data
Oct. 17, 2017  (NL) .................................. 2019747

(51) Int. Cl.
*F16L 55/035* (2006.01)
*F16L 3/10* (2006.01)
(Continued)

(52) U.S. Cl.
CPC ............ *F16L 55/035* (2013.01); *F16L 3/1016* (2013.01); *F16L 3/1091* (2013.01); *F16L 5/00* (2013.01); *F16L 59/135* (2013.01)

(58) Field of Classification Search
CPC ..... F16L 55/035; F16L 3/1016; F16L 3/1091; F16L 3/1075; F16L 5/00; F16L 59/135; F16B 2/10; F16B 2/02; E04D 13/08
(Continued)

(56) References Cited

U.S. PATENT DOCUMENTS 3,944,175 A * 3/1976 Kearney ................. E21F 17/02
                                                      248/59
4,488,696 A * 12/1984 Sauber ..................... H02G 3/22
                                                      248/65
(Continued)

FOREIGN PATENT DOCUMENTS

DE           8311423            8/1983
DE           8311423 U1         8/1983
(Continued)

OTHER PUBLICATIONS

International Search Report and Written Opinion for PCT/NL2018/050677 dated Jan. 31, 2019 (14 pages).

*Primary Examiner* — Nkeisha Smith
(74) *Attorney, Agent, or Firm* — Tutunjian & Bitetto, P.C.

(57) ABSTRACT

An isolation element for a riser clamp has two opposed clamp halves made of metal strip. Each of said clamp halves has a semi-circular section placed opposite each other against a riser pipe extending through a passage hole in a floor. The clamp halves have at the ends of its semi-circular section outwardly extending clamp flanges to be tightened towards the corresponding opposing clamp flanges of the other clamp half. The riser clamp is in use supported from beneath by a support structure. The isolation element includes a profile of vibration isolating material including a pad portion, which pad portion in use is located below the corresponding clamp flange for resiliently supporting it, and further including at least one upstanding portion extending
(Continued)

along the corresponding clamp flange, wherein said upstanding portion is attachable to the corresponding clamp flange.

16 Claims, 2 Drawing Sheets

(51) Int. Cl.
*F16L 5/00* (2006.01)
*F16L 59/135* (2006.01)

(58) Field of Classification Search
USPC ... 248/74.1, 74.2, 74.3, 74.4, 58, 62, 63, 65, 248/67.5, 67.7, 68.1, 610, 613, 615; 267/141
See application file for complete search history.

(56) References Cited

U.S. PATENT DOCUMENTS

| | | | | |
|---|---|---|---|---|
| 4,783,030 A * | 11/1988 | Buerhop | ............ | F16L 3/00 |
| | | | | 248/74.4 |
| 5,344,108 A * | 9/1994 | Heath | ............ | F16L 3/14 |
| | | | | 248/300 |
| 5,727,762 A * | 3/1998 | Cosentino | ............ | F16L 3/1016 |
| | | | | 248/154 |
| 6,240,689 B1 * | 6/2001 | Haddad | ............ | E04H 12/2261 |
| | | | | 248/49 |
| 6,945,735 B1 * | 9/2005 | Doverspike | ............ | F16L 1/09 |
| | | | | 248/207 |
| 7,010,889 B1 | 3/2006 | Renfro | | |
| 7,131,792 B2 * | 11/2006 | Doverspike | ............ | E03C 1/021 |
| | | | | 405/184.4 |
| 7,938,376 B2 * | 5/2011 | Jimenez | ............ | B60R 11/00 |
| | | | | 248/316.7 |
| 8,746,632 B2 * | 6/2014 | Walraven | ............ | F16L 3/1091 |
| | | | | 248/62 |
| 8,770,537 B2 * | 7/2014 | Go | ............ | F16L 3/237 |
| | | | | 248/560 |
| 9,482,253 B2 * | 11/2016 | Handa | ............ | E02F 9/00 |
| 10,663,353 B2 * | 5/2020 | Newlin | ............ | F16B 2/065 |
| 10,895,154 B2 * | 1/2021 | Zhang | ............ | A47B 91/00 |
| 10,914,405 B2 * | 2/2021 | Dodge | ............ | F16L 59/135 |
| 2003/0106968 A1 * | 6/2003 | Terrill | ............ | F16L 21/04 |
| | | | | 248/58 |
| 2005/0061925 A1 * | 3/2005 | Kirschner | ............ | F16L 3/1016 |
| | | | | 248/49 |
| 2009/0266944 A1 * | 10/2009 | Mominee | ............ | F16L 5/00 |
| | | | | 248/67.7 |
| 2014/0103171 A1 * | 4/2014 | Sutherland | ............ | H02G 3/32 |
| | | | | 248/74.3 |
| 2015/0214709 A1 * | 7/2015 | Landry | ............ | F16L 3/1058 |
| | | | | 248/74.2 |
| 2015/0233520 A1 * | 8/2015 | Fisher | ............ | F16L 59/135 |
| | | | | 219/201 |
| 2015/0238377 A1 * | 8/2015 | Muhammad | ............ | F16L 3/24 |
| | | | | 248/68.1 |
| 2016/0047496 A1 * | 2/2016 | O'Connell | ............ | F16L 3/08 |
| | | | | 248/72 |

FOREIGN PATENT DOCUMENTS

| | | |
|---|---|---|
| EP | 2344804 A1 | 7/2011 |
| JP | 2002130535 A | 5/2002 |
| WO | 2017173045 A1 | 10/2017 |

* cited by examiner

RISER CLAMP WITH A VIBRATION ISOLATION ELEMENT

FIELD OF THE INVENTION

The present invention relates to a riser clamp and a vibration isolation element for a riser clamp.

BACKGROUND OF THE INVENTION

A conventional riser clamp, for example shown in FIGS. 1 and 2 of U.S. Pat. No. 7,010,889, is tightened around a riser pipe, also referred to as a riser, using fasteners to either side of the circular portion defined by two semicircular sections. The straight sections to either side of the semicircular portion extend for a substantial distance. This extension is to insure that both straight sections of the clamp will extend to the floor for support around a hole created for passage of the riser therethrough. The fasteners are typically tightened to give very substantial compressive stress in order that the friction between the clamp and the heavy steel riser will retain the riser in place.

Since the riser clamps are resting on the floor they will transfer noise and other vibrations from the riser to the floor and the surrounding structure. To avoid transfer of vibrations it is known from the prior art to place a loose vibration isolating pad below the straight sections of the clamp for supporting the straight sections of the riser clamp. Such riser pads can be found on the market e.g. under the trademark Holdrite® by Hubbard Enterprises. A disadvantage of these known vibration isolating pads is that they have to be placed very precise. As the pads are loose components that can readily be positioned falsely it can occur that the straight section of the clamp in one spot is still touching the floor, thereby neutralising the effect of the pad. This can for instance happen during installation or tightening of the clamp when it can still be rotated around the riser pipe.

A riser clamp with an isolation element which obviates this disadvantage of the vibration isolating pads is disclosed in EP 2 344 804 B1. The isolation element is adapted to be provided on at least one of two opposing clamp flanges and to extend only along said at least one clamp flange, said isolation element including a profile of vibration isolating material comprising a resilient support strip, which support strip in use is located below the corresponding clamp flange for resiliently supporting it. The profile further comprises an upstanding web extending along the corresponding clamp flange. The web is attachable to the corresponding clamp flange.

In practise the passage hole through a floor may have a significant larger diameter as the outer diameter of the riser pipe. Thereby the length of the riser clamp flanges that is supported by the floor may be short. Since the load on the riser clamp may be high due to the weight of the riser pipe, the short length of the clamp flanges may be loaded too high, which may lead to deformation, failure or shifting of the clamp. Also the high load may lead to local excessive compression of the underlying vibration isolating member, which reduces the isolation function of the isolation element.

An object of the present invention is to obviate or at least mitigate one of these problems.

SUMMARY OF THE INVENTION

This object is achieved by an isolation element for a riser clamp. The riser clamp has two opposed clamp halves made of metal strip, each of said clamp halves having a semi-circular section. The semi-circular sections are, in use, placed opposite each other against a riser pipe extending through a passage hole in a floor, and each of said clamp halves has at the ends of its semi-circular section outwardly extending clamp flanges to be tightened towards the corresponding opposing clamp flanges of the other clamp half. The riser clamp is, in use, supported from beneath by a support structure e.g. a floor. The isolation element is adapted to be provided on at least one of two opposing clamp flanges and to extend only along said at least one clamp flange. The isolation element includes a profile of vibration isolating material comprising a pad portion, which pad portion, in use, is located below the corresponding clamp flange for resiliently supporting it, and further comprising at least one upstanding portion extending along the corresponding clamp flange, wherein said upstanding portion is attachable to the corresponding clamp flange. The isolation element furthermore includes a reinforcing profile made of a stiffer material than the vibration isolating material. The reinforcing profile has an angular shape comprising a web and a first flange which are joined at an angle portion, wherein the first flange of the reinforcing profile is associated with the pad portion and wherein the web is associated with the upstanding portion of the isolation element.

According to the invention the isolation element includes a reinforcing profile made of a stiffer material than the vibration isolating material. The reinforcing profile provides a distribution of the loads applied by the clamp flanges on the isolation element over the entire width of the isolation element, whereby loads are absorbed over a larger area of the pad portion and excessive compression of the vibration isolating material of the pad portion may be avoided. Furthermore, in the event that the length of the vibration isolating member exceeds the length of the clamp flanges, the reinforcing profile may act as an extension piece, which distributes the loads over al larger length than only the length of the riser clamp flanges. Moreover, because an angled reinforcing profile with an upstanding web is provided, a higher resistance to bending is provided in the vibration isolating member.

In another aspect the invention relates to a riser clamp having two opposed clamp halves, each of said clamp halves having a semi-circular section opposing the semi-circular section of the other clamp half for surrounding and clamping a riser pipe, and each of said clamp halves having at the ends of its semi-circular section outwardly extending clamp flanges to be tightened towards the corresponding opposing clamp flanges of the other clamp half. The riser clamp is adapted to be supported from beneath by a support surface such as a floor.

In one embodiment of the riser clamp one of the opposing clamp flanges is provided with an isolation element, said isolation element extending only along said clamp flange, said isolation element including a profile of vibration isolating material comprising a pad portion located below the corresponding opposing clamp flanges for resiliently supporting them, and further comprising at least one upstanding portion for extending along said clamp flange, wherein said upstanding portion is attached to said clamp flange. The isolation element furthermore includes a reinforcing profile made of a stiffer material than the vibration isolating material, said reinforcing profile having an angular shape comprising a web and a first flange which are joined at an angle portion, wherein the web is associated with the pad portion and wherein the first flange is associated with the upstanding portion of the isolation element.

In another embodiment of the riser clamp both of the opposing clamp flanges are provided with an isolation element, said isolation element extending only along the corresponding clamp flange, said isolation element including a profile of vibration isolating material comprising a pad portion located below the corresponding clamp flange for resiliently supporting it, and further comprising at least one upstanding portion for extending along said clamp flange, wherein said upstanding portion is attached to said clamp flange Preferably the reinforcing profile is made of metal, in particular steel. The reinforcing profile may be made by cutting a length of a beam comprising a web and at least a first flange. This may be an L-shaped beam, but also a beam with another, second flange may be used.

The vibration isolating material is typically rubber or another elastomer, but also other suitable vibration isolating materials may be used.

In a possible embodiment of the isolation element according to the invention the first flange is embedded in the pad portion.

Preferably the profile of vibration isolating material and the reinforcing profile are made as separate parts which are assembled. In a practical embodiment the pad portion of the vibration isolating profile is formed with a top plate and a base block which define an accommodation space in which the first flange of the reinforcing profile is inserted such that the first flange becomes embedded in the pad portion.

Another option is that the vibration isolated portion is extruded or injection moulded around the reinforcing profile whereby the first flange becomes embedded in the pad portion.

In a possible embodiment the web of the reinforcing profile is located against the upstanding portion of the isolation element. The web thus provides support and rigidity in transverse direction and bending resistance around a bending axis perpendicular to the web surface.

In a possible embodiment the upstanding portion is formed as a channel body to receive the clamp flange(s), said channel body having two opposing upstanding sides provided with passages for a tensioning element such as a bolt. In an assembled state of the riser clamp and the vibration isolating element, the clamp flange of one or both clamp halves are received in the channel body.

In a further embodiment the channel body is a slotted channel body having a side with a slot and an opposing bottom with a passage hole for a tensioning element, said bottom being arranged against the web of the reinforcing profile and the slotted side facing away from the web of the reinforcing profile. In this embodiment the slot is defined by two flexible retaining flanges of vibration isolating material. The clamp flanges of the riser clamp may be inserted in the channel body from the slotted side by flexing away one or both of the flexible retaining flanges. When the flanges are in the channel the flexible retaining flanges will flex back to their original state.

In a possible embodiment the reinforcing profile has a second flange at an end of the web remote from the first flange, said second flange preferably extending parallel to the first flange. By this shape the channel body is reinforced at three sides by the reinforcing profile. In a possible embodiment the upstanding portion has an upper end formation including an upper retaining means for engaging the second flange. The upper retaining means provides an accommodation space for the second flange whereby the reinforcing profile is held in place both on an upper and a lower side by the vibration isolating profile.

In a possible further embodiment the upper end formation includes a folding lip which is folded over an upper region of the web of the reinforcing profile. This provides a more secure retaining of the second flange in the upper retaining means, because the second flange cannot be withdrawn from the associated accommodation space.

In a further embodiment the underside of the pad portion has a surface which is adapted to be placed on a ground surface. In a possible further embodiment the pad portion has an underside which is adapted to be clamped on a mounting rail, in particular on a "strut" rail. Preferably the underside of the pad portion is provided with channels to receive flanges of the mounting rail. By the mounting rail underneath the riser clamp flanges and the vibration isolating element an additional spacing can be created between the riser clamp and the floor surface. The vibration isolating element can thus be used in a versatile way.

DETAILED DESCRIPTION OF THE PREFERRED EMBODIMENTS

Figure 1:
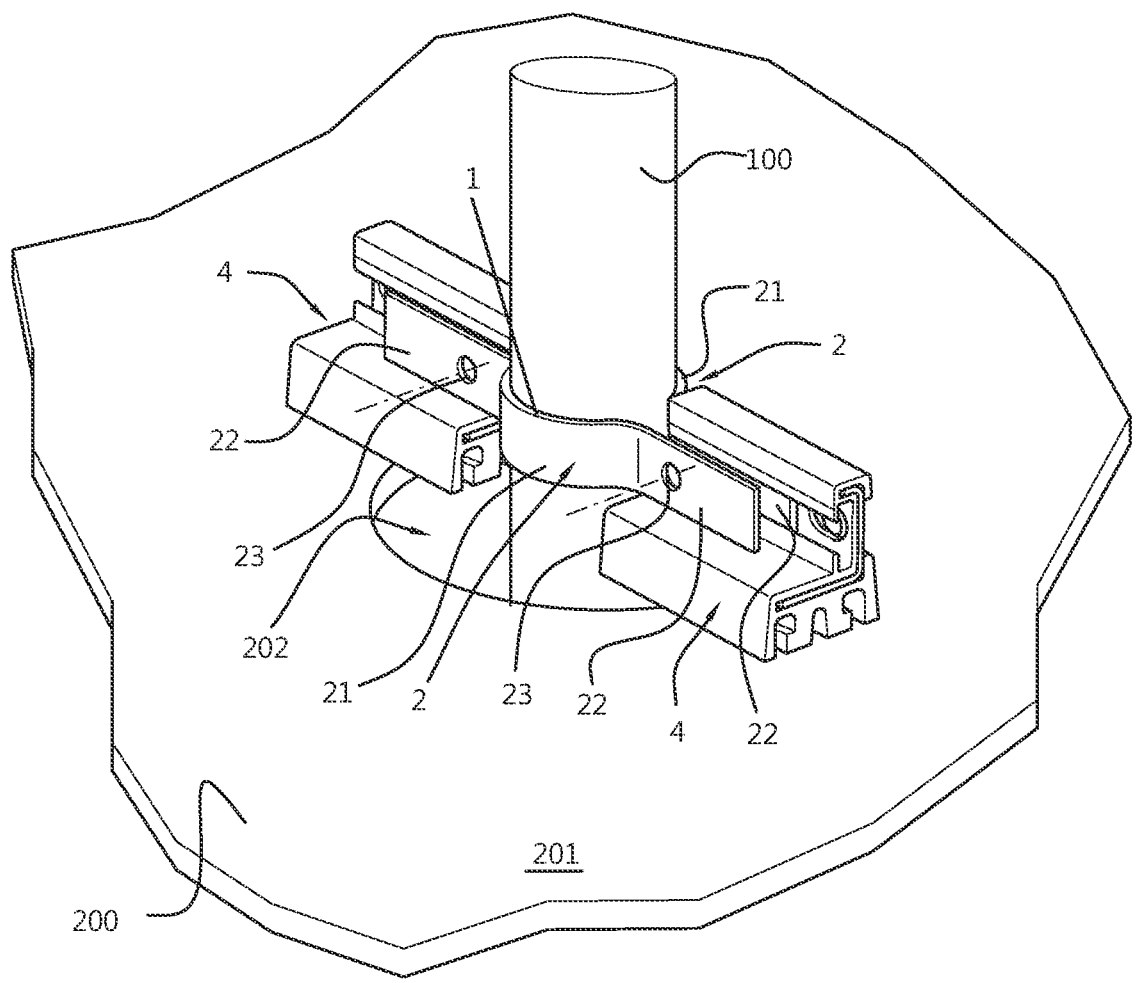
FIG. 1 shows in a perspective view a preferred embodiment of a riser clamp according to the invention.

Referring to FIG. 1 is shown a riser clamp 1. The riser clamp 1 comprises two riser clamp halves 2 formed out of metal strip. The riser clamp halves 2 each have a semi-circular section 21 and two straight sections 22 extending radially from the respective ends of the semi-circular section 21.

In use, the semi-circular sections 21 are placed on opposite sides of a riser pipe 100 that extends through a passage hole 202 in a floor 200. The opposed straight sections 22 are brought in a mutually opposing position as is shown in FIG. 1. In the following the straight sections 22 will be referred to as clamp flanges 22. The clamp flanges 22 are provided with holes 23 for running through a shaft of a bolt, screw or other suitable tightening means (not shown), such that the clamp flanges 22 can be tightened towards each other and the semi-circular sections 21 are tightly clamped against the riser pipe 100. The clamp flanges 22 are supported by a floor surface 201 surrounding the passage 202 via isolation elements 4. Each pair of opposing clamp flanges 22 is supported by an isolation element 4. Such an isolation element 4 is separately shown in FIG. 2.

The isolation element 4 includes a vibration isolating profile 40 made of vibration isolating material, such as for example rubber or another elastomer. The vibration isolating profile 40 basically comprises a pad portion 42 and an upstanding portion 41. The pad portion 42 is in use located below the corresponding clamp flange 22 for resiliently supporting it, as is shown in FIG. 1. The upstanding portion 41 extends along the corresponding clamp flange 22. The upstanding portion 41 is attachable to the corresponding clamp flange 22. The vibration isolating profile 40 is preferably made by means of an extrusion process.

The extruded profile is then cut to the desired length and holes may be punched in the bottom 43.

The upstanding portion 41 of the vibration isolating profile 40 is formed as a slotted channel body 41A in which the clamp flange 22 of one of the clamp halves 2 is received as is shown in FIG. 1. The slotted channel body 41A comprise a bottom 43, lateral walls 44 and 45 and flexible retaining flanges 47 and 48 extending inwardly from the lateral walls 44 and 45, respectively. The retaining flanges 47 and 48 define a slot 41B between them.

The bottom 43 of the channel body 41 extends transversely, preferably perpendicularly from the pad portion 42. The bottom 43 is provided with at least one hole 43A which in use is in register with the hole 23 in the clamp flange 22 for passing through a bolt.

The lower lateral wall 45 of the channel body 41 is the extension of a top plate 49 of the pad portion 42. The top plate 49 is a flexible plate that overlies the pad portion 42 and at a lateral side is connected to the remainder of the pad portion 42 by a connection portion 49A. Between the top plate 49 and the remainder of the pad portion 42 a receiving space 50 is defined.

The isolation element 4 furthermore includes a reinforcing profile 60 made of a stiffer material than the vibration isolating material. This stiffer material is preferably steel or another metal. The reinforcing profile is preferably made of a cut length of a metal profile.

The reinforcing profile 60 has an angular shape comprising a web 61 and a first flange 62 which join each other at an angle portion 63. The angle of the angle portion 63 preferably is 90° but may also be different. The first flange 62 of the reinforcing profile 60 is associated with the pad portion 42 of the vibration isolating profile 40. The web 61 of the reinforcing profile 60 is associated with the upstanding portion 41 of the vibration isolating profile 40. One or more holes 69 are punched in the web 61. The holes 69 in the web 61 and the holes 43A in the bottom 43 are arranged in register to pass through bolts or other tensioning means to tighten the clamp flanges 22 that are received in the channel body 41 towards each other.

The reinforcing profile 60 has a second flange 64 at an end of the web 61 remote from the first flange 62. The second flange 64 in the preferred embodiment shown in FIGS. 1 and 2 extends parallel to the first flange 62. The second flange 64 has a smaller width than the first flange 62.

The first flange 62 of the reinforcing profile 60 is accommodated in the receiving space 50 of the pad portion 42.

At the end of the upper lateral wall 44 of the channel body 41 a top strip 46 is formed which extends substantially parallel with the upper lateral wall 44 and is connected thereto by a connection portion 46A. The top strip 46 and the lateral wall 44 define between them a receiving space 51 in which the second flange 64 of the reinforcing profile 60 is accommodated. The top strip 46 has at an end remote from the connection portion 46A a folding lip 46B extending along an upper region of the web 61.

The previously mentioned remainder of the pad portion 42 comprises a base block 52. This base block 52 has a sufficient thickness to maintain the riser clamp 1 at a sufficient space from the floor surface 201 and to provide sufficient vibration isolation effect.

When the riser clamp and the isolation element 4 are assembled, the flanges 22 of one of the clamp halves 2 are received in the slotted channel bodies 41A of the respective isolation elements 4. The flanges 22 of the other clamp halve 2 are positioned opposed to the flanges 22 in the channel body 41A, but outside the channel body 41A. These latter flanges thus rest on the top plate 49 near or against the flange 48. The opposing flanges are tightened towards each other by bolts and nuts or other tensioning means (not shown in FIG. 1 for the sake of visibility) extending through the registering holes 23 to tighten the semicircular sections 21 of the clamp halves against the pipe 100. The flanges 47 and 48 are between the two opposing flanges 22 in the assembled state as can be seen in FIG. 1.

Figure 2:
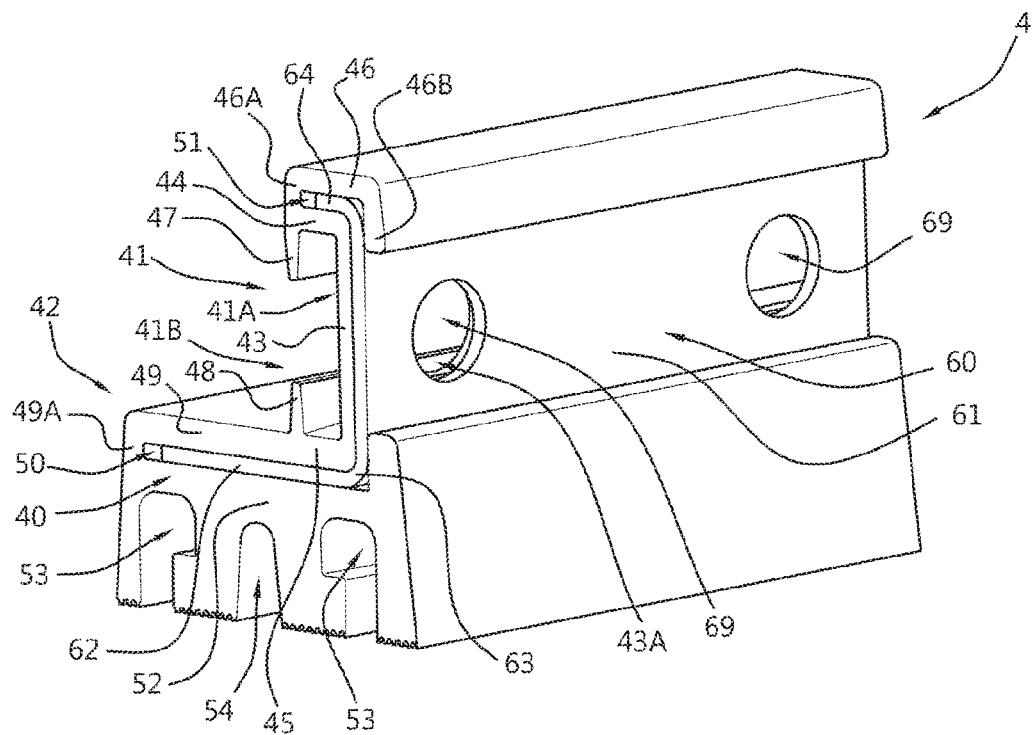
FIG. 2 shows in a perspective view a preferred embodiment of a vibration isolating element according to the invention.
Figure 3:
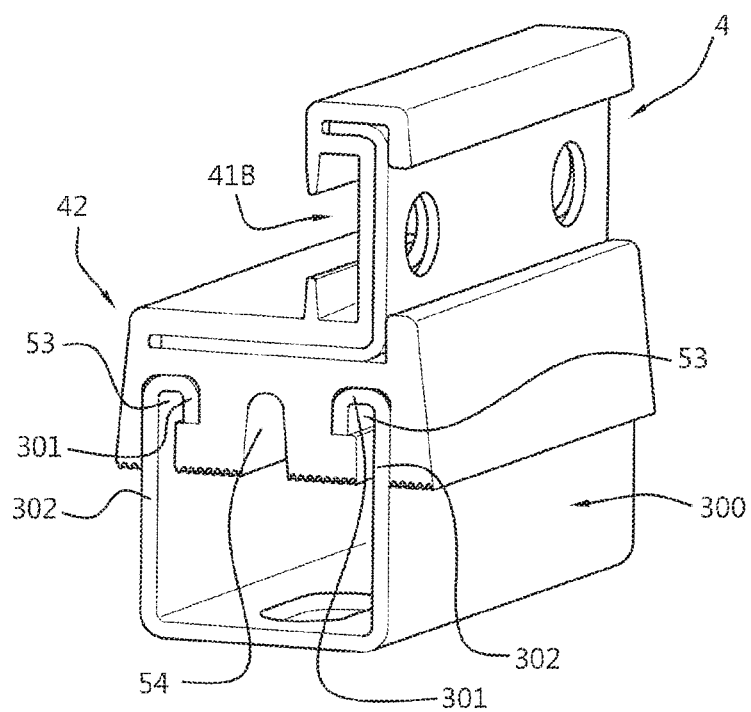
FIG. 3 shows in a perspective view the vibration isolating element of FIG. 2 placed on a mounting rail.

In the preferred embodiment shown in FIGS. 1 and 2 the base block 52 is provided at an underside with longitudinally extending channels 53 and a central longitudinal recess 54. As is illustrated in FIG. 3, the channels 53 are adapted to receive upper ends of a mounting rail 300, in particular a mounting rail that in the market is known as a "strut rail", which is a slotted channel with folded flanges 301 which delimit the longitudinal slot of the rail. The folded flanges 301 of the rail and a part of the lateral walls 302 fit in the channels 53. The central longitudinal recess allows that the resilient vibration isolating material between the central recess 54 and the channels 53 can be deformed when the base block is pushed on the mounting rail and the flanges 301 of the rail 300 can be received in the channels 53. By arranging a mounting rail 300 underneath the base block 52 an additional spacing can be created between the riser clamp 1 and the floor surface 201.

The invention claimed is:

1. An isolation element and a riser clamp,
    said riser clamp having two opposed clamp halves made of metal strip, each of said clamp halves having a semi-circular section, said semi-circular sections in use being placed opposite each other against a riser pipe extending through a passage hole in a floor, and each of said clamp halves having at ends of its semi-circular section outwardly extending clamp flanges to be tightened towards corresponding opposing clamp flanges of the other clamp half, said riser clamp in use being supported from beneath by a support structure;
    the isolation element being adapted to be provided on and to extend along at least one of two opposing clamp flanges said isolation element including a profile of vibration isolating material comprising a pad portion, wherein the pad portion is located below the at least one of the two opposing clamp flanges for resiliently supporting the at least one of the two opposing clamp flanges, and further comprising at least one upstanding portion extending along the at least one of the two opposing clamp flanges wherein said upstanding portion is attachable to said at least one of the two opposing clamp flanges with which the isolation element extends along,
    wherein the isolation element further includes a reinforcing profile made of a stiffer material than the vibration isolating material, said reinforcing profile having an angular shape comprising a web and a first flange which are joined at an angle portion, wherein the first flange of the reinforcing profile is associated with the pad portion and wherein the web is associated with the upstanding portion of the isolation element.

2. The isolation element and the riser clamp according to claim 1, wherein the reinforcing profile is made of metal.

3. The isolation element and the riser clamp according to claim 1, wherein the first flange is embedded in the pad portion.

4. The isolation element and the riser clamp according to claim 1, wherein the web of the reinforcing profile is located against the upstanding portion of the isolation element.

5. The isolation element and the riser clamp according to claim 1, wherein the upstanding portion is formed as a channel body to receive the clamp flanges, said channel body having two opposing upstanding sides provided with passages for a tensioning element such as a bolt.

6. The isolation element and the riser clamp according to claim 5, wherein the channel body is a slotted channel body having a side with a slot and an opposing bottom with a passage hole for a tensioning element, said bottom being arranged against the web of the reinforcing profile and the side with the slot facing away from the web of the reinforcing profile.

7. The isolation element and the riser clamp according to claim 1, wherein the reinforcing profile has a second flange at an end of the web remote from the first flange.

8. The isolation element and the riser clamp according to claim 7, wherein the upstanding portion has an upper end formation including an upper retaining means for engaging the second flange.

9. The isolation element and the riser clamp according to claim 7, wherein the second flange extends parallel to the first flange.

10. The isolation element and the riser clamp according to claim 8, wherein the upper end formation includes a folding lip which is folded over an upper region of the web of the reinforcing profile.

11. The isolation element and the riser clamp according to claim 1, wherein the pad portion has an underside which is adapted to be clamped on a mounting rail.

12. The isolation element and the riser clamp according to claim 11, wherein the underside of the pad portion is provided with channels to receive flanges of the mounting rail.

13. The isolation element and the riser clamp according to claim 11, wherein the underside of the pad portion has a surface which is adapted to be placed on a ground surface.

14. The isolation element and the riser clamp according to claim 11, wherein the underside is adapted to be clamped on a "strut" rail.

15. A riser clamp having two opposed clamp halves, each of said clamp halves having a semicircular section opposing the semicircular section of the other clamp half for surrounding and clamping a riser pipe, and each of said clamp halves having at ends of its semicircular section outwardly extending clamp flanges to be tightened towards corresponding opposing clamp flanges of the other clamp half, said riser clamp being adapted to be supported from beneath by a support surface, wherein at least one of the clamp flanges is provided with an isolation element, said isolation element extending along said at least one of the clamp flanges, said isolation element including a profile of vibration isolating material comprising a pad portion located below and resiliently supporting said at least one of the clamp flanges, and further comprising at least one upstanding portion for extending along said at least one of said clamp flanges, wherein said upstanding portion is attached to said at least one of said clamp flanges with which the isolation element extends along, wherein the isolation element furthermore includes a reinforcing profile made of a stiffer material than the vibration isolating material, said reinforcing profile having an angular shape comprising a web and a first flange which are joined at an angle portion, wherein the web is associated with the pad portion and wherein the first flange is associated with the upstanding portion of the isolation element.

16. A riser clamp having two opposed clamp halves, each of said clamp halves having a semicircular section opposing the semicircular section of the other clamp half for surrounding and clamping a riser pipe, and each of said clamp halves having at ends of its semicircular section outwardly extending clamp flanges to be tightened towards corresponding opposing clamp flanges of the other clamp half, said riser clamp being adapted to be supported from beneath by a support surface, wherein both of the clamp flanges are provided with an isolation element, said isolation element extending along each clamp flange, said isolation elements including a profile of vibration isolating material comprising a pad portion located below each clamp flange for resiliently supporting each clamp flange, and further comprising at least one upstanding portion for extending along each clamp flange, wherein said upstanding portion is attached to each clamp flange, wherein each isolation element furthermore includes a reinforcing profile made of a stiffer material than the vibration isolating material, said reinforcing profile having an angular shape comprising a web and a first flange which are joined at an angle portion, wherein each web is associated with each pad portion and wherein each first flange is associated with each upstanding portion of each isolation element.

* * * * *